May 5, 1964   S. HARRIS   3,131,434
DENTAL FLASKS
Filed July 20, 1962
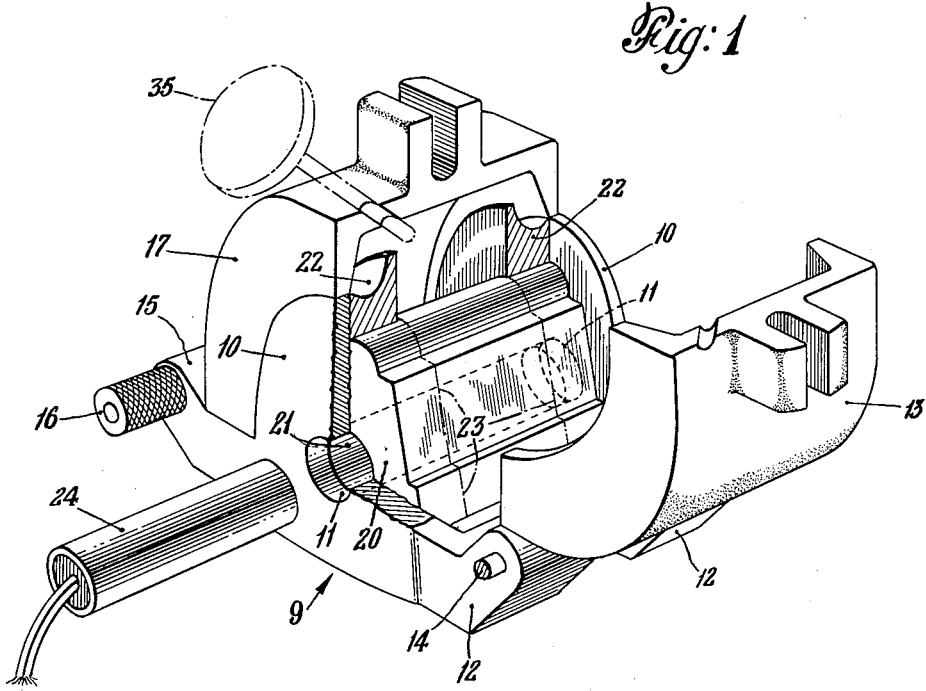
Fig: 1
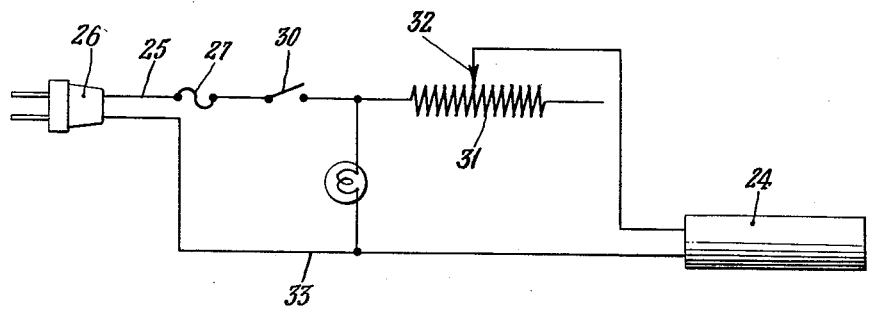
Fig: 2.
INVENTOR.
SAMUEL HARRIS
BY William P. Began
ATTORNEY

3,131,434
DENTAL FLASKS
Samuel Harris, 94—15 69th Ave., Forest Hills, N.Y.
Filed July 20, 1962, Ser. No. 211,227
4 Claims. (Cl. 18—33)

This invention relates to a dental flask wherein artificial dentures are formed and more particularly to means for during acrylic teeth secured to metal bridgework in a three member hinged dental flask.

The present invention is particularly suited to a three member hinged dental flask of the type disclosed in my earlier patent, No. 2,896,259. In the flask therein disclosed there is provided a shell-like base member that accommodates a convex platform piece over which investment material is placed. A metal dental bridge having wax teeth formed thereon in the places where acrylic teeth are ultimately to be provided in arched over, and embedded in the convex surface of the investment material. An upper flask member hinged to one end of the base member is filled with investment material whereupon it is pivoted into engagement with one half of the bridgework embedded in the investment material formed on the platform. A second upper flask member hinged to the other end of the base member is similarly filled with investment material and pivoted into engagement with the other half of the embedded bridgework. After the investment material has hardened and the flask opened, an impression of the wax teeth is found in the investment material of the upper flask members. The wax can then be melted from the metal bridgework and a mold is thus provided into which acrylic material is placed. By reclosing and tightening the flask, the acrylic material in the form of teeth conforming to the pattern of the mold is adhered to the metal bridgework. The flask containing the acrylic teeth is then placed in an oven and baked to complete the process of forming an acrylic dental bridge.

As noted above the current practice followed in curing the acrylic dental bridge is to take the flask containing uncured acrylic bridge and place it in the ordinary oven found in the dental laboratory. The flask was then baked until the acrylic material was cured. While the oven procedure resulting in satisfactory acrylic dental bridges it was accompanied by several disadvantages. In the first place, the three member hinged dental flask in which the dental bridge is formed is comparatively large so that a rather large oven must be used. Secondly, since the entire flask and the investment material must be brought to the curing temperature, the time taken to cure the acrylic material is rather long.

Accordingly, it is the object of the present invention to provide improved means for curing an acrylic dental bridge formed in a three member hinged dental flask.

In carrying out the present invention there is provided an improved three member hinged dental flask having a hole or opening extending through the side walls of the base member and the removable convex platform placed therein. The arrangement is such that an electrical heater element can be inserted in the hole or opening and the acrylic dental bridge cured by energizing the heater element.

Features and advantages of the invention may be gained from the foregoing and from the description of a preferred embidment thereof which follows.

In the drawings:
FIGURE 1 is a perspective view of the flask, partially open and with parts broken away, showing the improvement of the persent invention; and
FIGURE 2 is a simplified schematic wiring diagram showing the electrical circuit for the heater element.

In FIGURE 1 of the drawing there is shown a preferred three member hinged dental flask embodying the invention. A base member 9 is illustrated having upstanding spaced apart sidewalls 10 in the middle section thereof. The sidewalls are provided with aligned apertures 11 as shown. One end of member 9 is provided with two lugs 12 that are spaced apart so as to accommodate a hook or protruberance having a hole therein (not shown) formed on the bottom of the upper flask member 13. The hook or equivalent part engages a pin 14 that passes through or is press fitted into lugs 12 and permits member 13 into and out of engagement with the convex surface of sidewalls 10.

The other end of base 9 is likewise provided with spaced-apart lugs 15 that together with pin 16 cooperate with a pivot member formed at the bottom of the second upper flask member 17. Both upper flask members 13 and 17 are of arcuate form and are hollow as is shown.

The top of the base between sidewalls 10 is dished-out to form a receptacle for the platform 20 over which the dental arch is placed. The platform is provided with an aperture 21 such that when the platform is in place, the aperture aligns with those provided in sidewalls 10. The platform may be said to be of stepped triangular form with curved surface on top. As shown it extends from sidewall to sidewall of the flask. A so-called locking-piece 22 is provided for a purpose fully described in the aforementioned patent and consequently not further described here. Locking-piece 22 may be formed integral with the sidewalls 10 in which case the platform 20 would be somewhat narrower, extending only between the dot-dash lines 23.

An electrical heating element 24 is provided for insertion into the apertures 11 and 21 provided in the sidewalls 11 and platform 20 respectively. The heating element is connected in the circuit schematically shown in FIGURE 2, wherein a conductor 25 leads from plug 26 to a fuse 27 and thence to a single pole single throw switch 30 to a rheostat 31. The variable tap 32 of the rheostat leads directly to the heating element from whence conductor 33 leads back to the other terminal of plug 26. A lamp 34 may be provided to give a signal indication when the heating element is energized.

In operation, the three member hinged flask is assembled as shown in FIGURE 1. Investment material is placed over platform 20 to a height that brings it in line with the top surface of locking piece 22. It might be noted here that locking piece could be omitted if desired in which event the investment material would be placed over the platform to a line with the top of the sidewall. Of course, the flask members would not fit as well as when piece 22 is used and it would be more difficult to remove the hardened investment material from platform 20. The dental bridgework with wax teeth formed thereon is then arched over the investment material placed on the platform with the wax teeth exposed in the surface of the material. When the investment material is hardened fresh investment material is placed in the hollows of upper flask members 13 and 17 and these members are pivoted into engagement with the hardened investment material and the exposed wax teeth. In other words, the flask is closed. A thermometer 35 may be inserted through the aperture formed in the upper flask members before the investment material in these members hardens. When the investment material hardens the flask is opened and the wax teeth melted and removed. What remains is a mold in which acrylic material can be processed to the now exposed metal bridgework.

Plastic arcylic material is then laid over the metal bridgework and the flask closed. The flask is then placed in a press such as that disclosed in co-pending application Ser. No. 110,427 filed May 16, 1961. After the excess acrylic material is removed, that remaining in the mold must be cured. At this time heater element 24 is inserted in apertures 11 and 21. Plug 26 is connected to a power source and switch 30 is closed. Rheostat 31 is adjusted until the heating element causes thermometer to reach a prescribed reading which is maintained for a predetermined period of time after which the acrylic material is properly cured. Heater element can then be removed and the flask allowed to cool. Instead of controlling the heat output of element 24 by a rheostat, a limited output heating element can be provided in which event it is only necessary to energize the heating element for a predetermined time. After determining the proper heating element it might not even be necessary to use a thermometer to check the temperature.

Inasmuch as many apparently different embodiments of the invention can be made without departing from its spirit or scope, it is intended that what has been shown in the drawing and described in the specification be interpreted as illustrative and not in a limiting sense.

What is claimed is:

1. A three member hinged dental flask comprising a base member having upstanding spaced-apart sidewalls, each of said sidewalls being provided with an aperture, a first upper flask member pivotally connected to said base member, a second upper flask pivotally connected to said base member, and a platform member adapted to be placed in said base member, said platform being provided with an aperture, the arrangement being such that when the platform is placed in said base member the apertures in said sidewalls and said platform are aligned.

2. The combination with a three member hinged dental flask comprising a base member having upstanding spaced-apart sidewalls, each of which is provided with an aperture, a first upper flask member pivotally connected to said base member, a second upper flask member pivotally connected to said base member, and a platform member adapted to be placed in said base member, said platform being provided with an aperture, the arrangement being such that when the platform is placed in said base member the apertures in said sidewalls and said platform are aligned, of an electrical heater element adapted to be placed in the aligned apertures of said sidewalls and said platform and means for connecting said element to a power source.

3. The combination according to claim 2 including a signal lamp for indicating when the heater element is connected to the power source.

4. The combination according to claim 2 wherein the connecting means includes a rheostat for controlling the electrical energy delivered to the heater element.

References Cited in the file of this patent

UNITED STATES PATENTS 1,360,986    Lamb _____ Oct. 24, 1944

FOREIGN PATENTS 491,438    Great Britain _____ Sept. 1, 1938